United States Patent [19]
Huang

[11] Patent Number: 6,148,964
[45] Date of Patent: Nov. 21, 2000

[54] FRONT DISK BRAKE FOR A BICYCLE

[76] Inventor: Bill Huang, No. 5-15, Lun Ya Lane, Lun Ya Lee, Yuanlin Chen, Changhau Hsien, Taiwan

[21] Appl. No.: 09/309,915

[22] Filed: May 11, 1999

[51] Int. Cl.⁷ ...................................................... B62L 5/00
[52] U.S. Cl. ...................................... 188/26; 188/218 XL
[58] Field of Search ............................... 188/24.19, 72.7, 188/72.8, 71.7, 196 M, 196 V, 26, 218 XL

[56] References Cited

U.S. PATENT DOCUMENTS

| | | | |
|---|---|---|---|
| 3,989,124 | 11/1976 | Fujii ........................................... | 188/26 |
| 5,632,362 | 5/1997 | Leitner ..................................... | 188/344 |
| 5,950,772 | 9/1999 | Buckley et al. .......................... | 188/26 |
| 5,960,914 | 10/1999 | Isai ........................................ | 188/72.8 |
| 5,979,609 | 11/1999 | Tsai ......................................... | 188/26 |

*Primary Examiner*—Michael Mar
*Assistant Examiner*—Benjamin A. Pezzlo
*Attorney, Agent, or Firm*—Varndell & Varndell, PLLC

[57] ABSTRACT

A front disk brake, which includes a brake disk fixedly mounted on a hub at the front fork of a bicycle, and a brake caliper mounted on lugs at the front fork of the bicycle by a mounting frame and pulled by a brake line to stop the brake disk, wherein the brake caliper includes a body mounted on the mounting frame, the body having a narrow slot, which receives the brake disk, two inside annular grooves at two opposite sides of the slot, and two sets of steel balls moved in the slot, two cam shafts mounted in the body, the cam shafts each having a head and ball grooves equiangularly spaced at the head, the ball grooves receiving the steel balls and each having a depth gradually deeper from one end toward the other end, and a pull bar driven by the brake line to turn the cam shafts, enabling the cam shafts to be respectively forced outwards by the steel balls toward two opposite side walls of the brake disk.

4 Claims, 5 Drawing Sheets

FRONT DISK BRAKE FOR A BICYCLE

BACKGROUND AND SUMMARY OF THE INVENTION

The present invention relates to a front disk brake for a bicycle, and more particularly to a high performance front disk brake which can quickly and positively be installed, and driven to stop the brake disk positively stably.

A bicycle is not only a simple personal transportation vehicle but also an implement for sports. A bicycle generally has a front brake for operation by hand through a brake lever to stop the wheels from movement. A conventional bicycle front brake is a caliper brake having two brake calipers holding a respective brake pad. When the brake cable is pulled up, the brake calipers are driven to press the respective brake pads on the rim of the front wheel of the bicycle, causing the front wheel to be stopped from movement. Recently, various front disk brakes which are commonly used in motorcycles have been used in bicycles. A front disk brake is generally comprised of a brake disk fixedly fastened to the hub at the front fork of the bicycle, and a brake caliper mounted on lugs at the front fork and driven by a brake line to stop the brake disk from rotation. Because the brake caliper is driven by a brake line but not a hydraulic system as used in a motorcycle, pressure may not be evenly employed to two opposite side walls of the brake disk when the brake caliper is driven by the brake line to stop the brake disk from movement. Furthermore, because the body of the brake caliper has a narrow slot for receiving the brake disk, the brake caliper must be mounted on the lugs at the front fork of the bicycle in the accurate position so that the brake disk can be accurately suspended in the middle of the narrow slot at the body of the brake caliper. During installation, packing members may be required to adjust the position of the body of the brake caliper so that the body of the brake caliper can be accurately matched with the brake disk. This installation procedure is complicated.

According to one aspect of the present invention, the front disk brake comprises a brake disk fixedly mounted on a hub at the front fork of a bicycle, and a brake caliper mounted on lugs at the front fork of the bicycle and pulled by a brake line to stop the brake disk, wherein the brake caliper comprises a body, the body having a narrow slot, which receives the brake disk, two inside annular grooves at two opposite sides of the slot, and two sets of steel balls moved in the slot, two cam shafts mounted in the body, the cam shafts each having a head and ball grooves equiangularly spaced at the head, the ball grooves receiving the steel balls and each having a depth gradually deeper from one end toward the other end, and a pull bar driven by the brake line to turn the cam shafts, enabling the cam shafts to be respectively forced outwards by the steel balls toward two opposite side walls of the brake disk. Because the cam shafts are synchronously turned by the pull bar and forced outwards by a respective set of steel balls, pressure is evenly employed from the brake caliper to the two opposite side walls of the brake disk when the brake line is pulled up. According to another aspect of the present invention, a mounting frame is provided and installed in the lugs at the front fork of the bicycle to hold the body of the brake caliper, enabling the body of the brake caliper to be conveniently adjusted to the accurate position to match with the brake disk.

DETAILED DESCRIPTION OF THE PREFERRED EMBODIMENT

Figure 1:
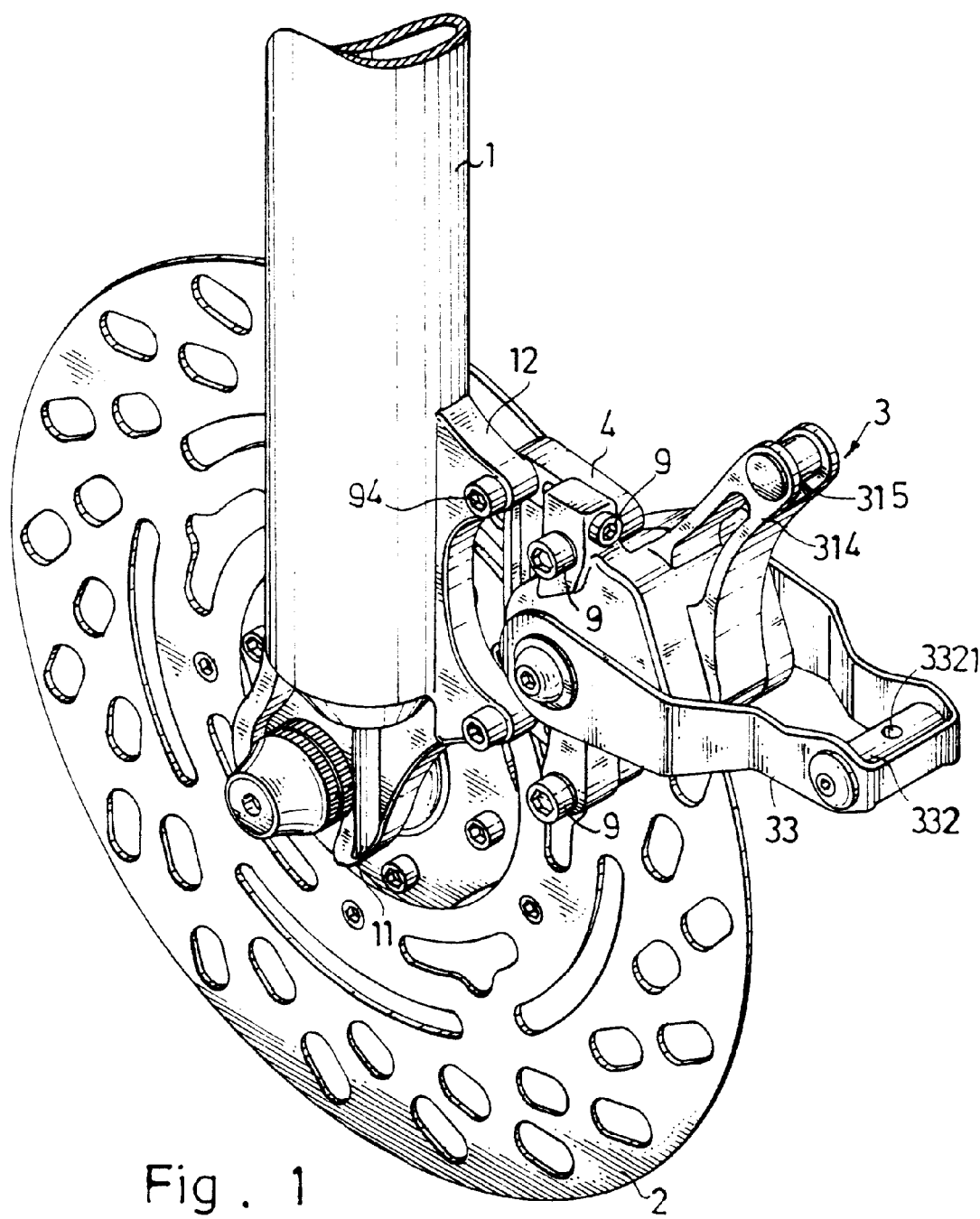
FIG. 1 is a perspective view showing a front disk brake installed in the front fork of a bicycle according o the present invention.
Figure 2:
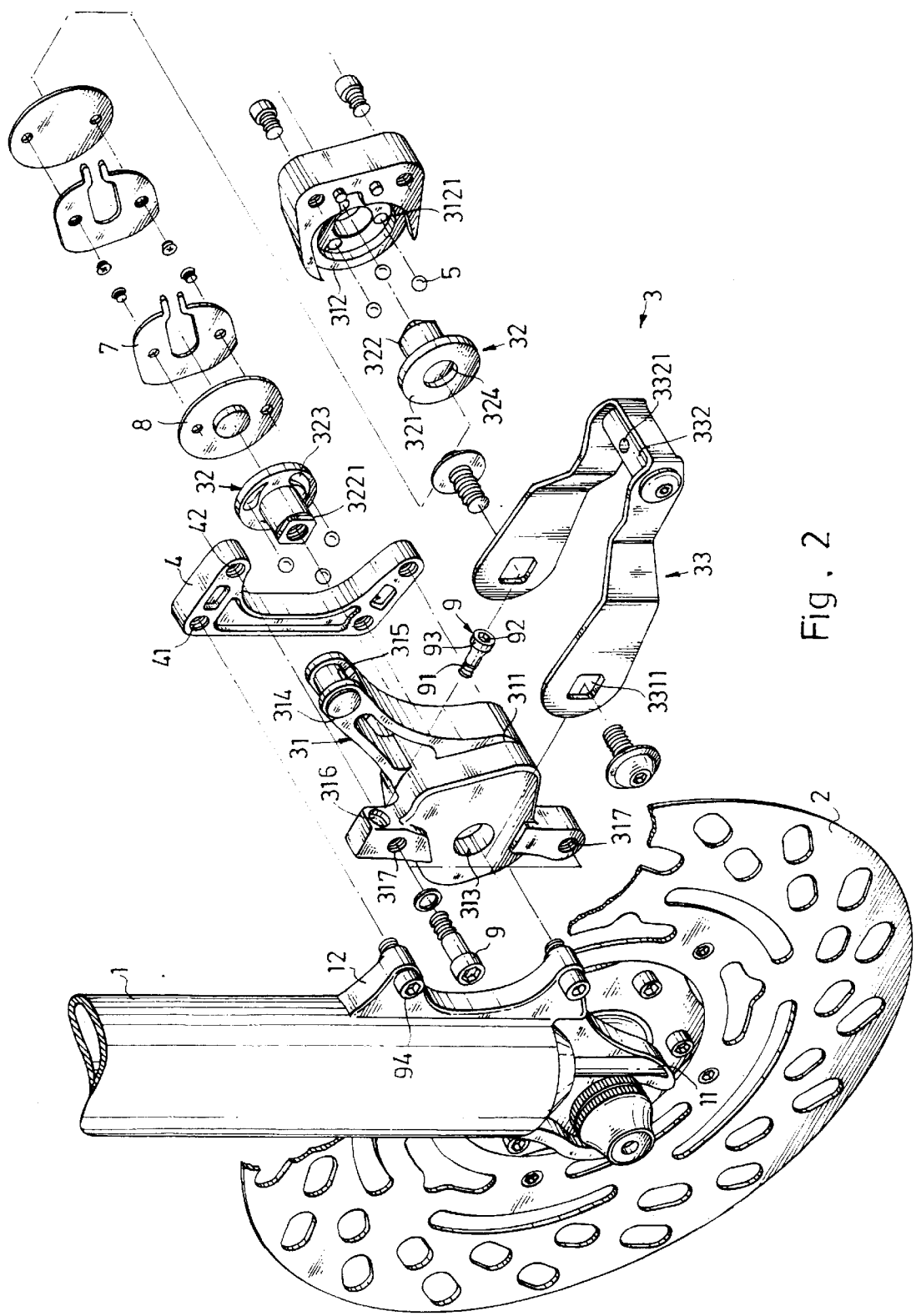
FIG. 2 is an exploded view of FIG. 1.
Figure 3:
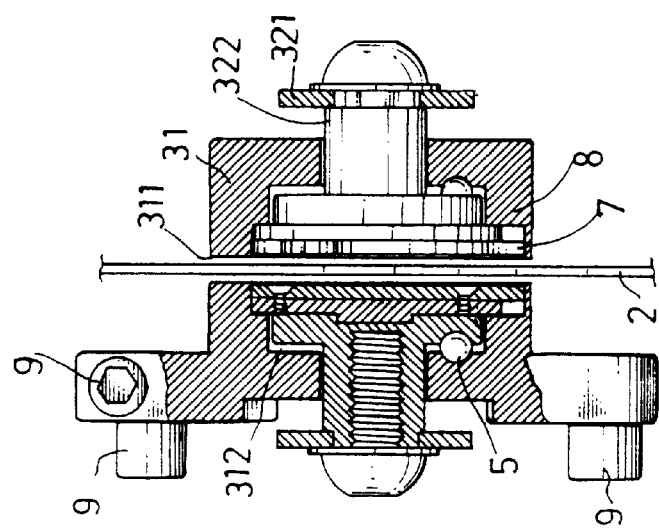
FIG. 3 is a sectional view of the brake caliper of the front disk brake according to the present invention.

Referring to FIGS from 1 through 3, a brake disk 2 and a brake caliper 3 are installed in the hub 11 at the front fork 1 of a bicycle (not shown). The brake disk 2 is fixedly fastened to the hub 11. The brake caliper 3 is fastened to the front fork 1 by a mounting frame 4, comprised of a body 31, left and right cam shafts 32, and a Pull bar 33.

The body 31 of the brake caliper 3 is a rhombic block comprising a narrow slot 311 for receiving the brake disk 2, two receiving chambers 312 at two opposite sides of the narrow slot 311, an inside annular groove 3121 respectively provided inside each of the receiving chambers 312, a plurality of steel balls 5 respectively moved in the inside annular groove 3121 at each of the receiving chambers 312, an axle hole 313 through the receiving chambers 312 and the narrow slot 311, a protruded portion 314, a bushing 315 pivoted to the protruded portion 314 for the passing of the brake line 6, two first screw holes 316 provided at two opposite sides and respectively fastened to the mounting frame 4 by a respective mounting screw 94, two second screw holes 317 disposed at two opposite sides and respectively peripherally intersecting the first screw holes 316, and two positioning screw bolts 9 threaded into the second screw holes 317.

The cam shafts 32 are respectively mounted in the receiving chambers 312 inside the body 31, each comprising a flat, circular head 321, a shaft body 322 perpendicularly extended from one side of the circular head 321 at the center, a plurality of ball grooves 323 formed at the bottom side wall of the circular head 321 around the shaft body 322, and a recessed hole 324 at the center of the top side wall of the circular head 321 in which a respective gasket 8 is installed to hold a respective fixed brake pad 7. The ball grooves 323 are shaped like a drop of water and provided to match with the inside annular groove 3121 in the body 31, each having a depth gradually increased from the narrow end toward the broad end. The shaft body 322 has a square retraining end 3221 coupled to the pull bar 33.

The pull bar 33 is a substantially U-shaped member comprising a transverse base 332, and two parallel arms 321 extended from two opposite ends of the transverse base 332. The transverse base 332 has a hole 3321 to which one end of the brake like 6 is fastened. The arms 321 each have a square hole 3311 at the end to which the square retaining end 3221 of the shaft body 322 of the corresponding cam shaft 32 is fastened.

The mounting frame 4 is a substantially U-shaped member having two pairs of screw holes 41 and 42 respectively disposed in four corners thereof. One pair of screw holes 41 of the mounting frame 4 are fastened to respective lugs 12 at the front fork 1. The other pair of screw holes 42 of the mounting frame 4 are respectively fastened to the screw holes 316 at the body 31.

Figure 6:
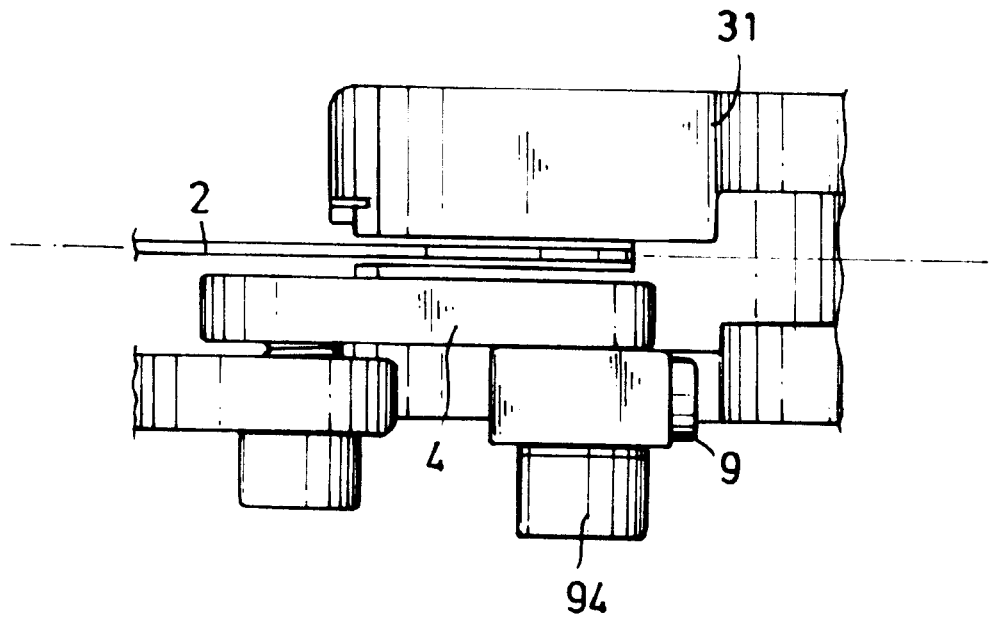
FIG. 6 is a top view of the present invention, showing the positioning of the brake caliper on the mounting frame.
Figure 7:
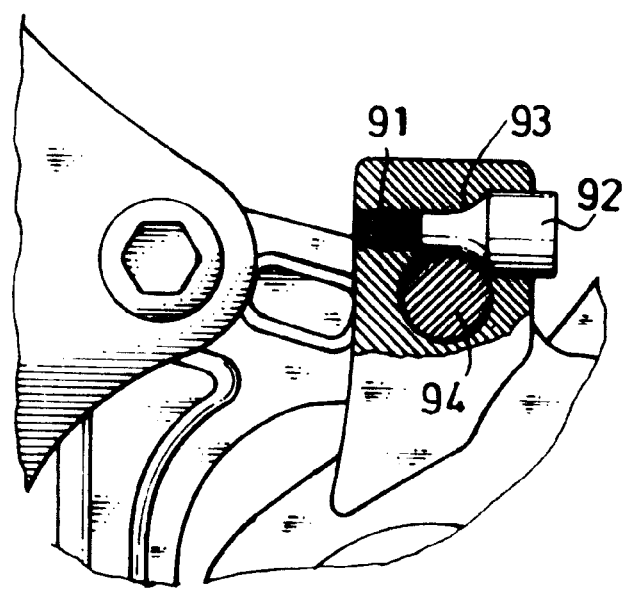
FIG. 7 is a sectional view of a part of the present invention, showing the conical shoulder of the positioning screw bolt stopped at the respective mounting screw.

The aforesaid positioning screw bolts 9 each comprise a threaded shank 91 respectively threaded into the second screw holes 317 at the body 31, a head 92 disposed outside the corresponding second screw hole 317, and a conical shoulder 93 connected between the head 92 and the threaded shank 91 and disposed in contact with the respective mounting screw 94, enabling the respective mounting screw 94 to be firmly retained in place (see FIGS. 6 and 7).

Figure 4:
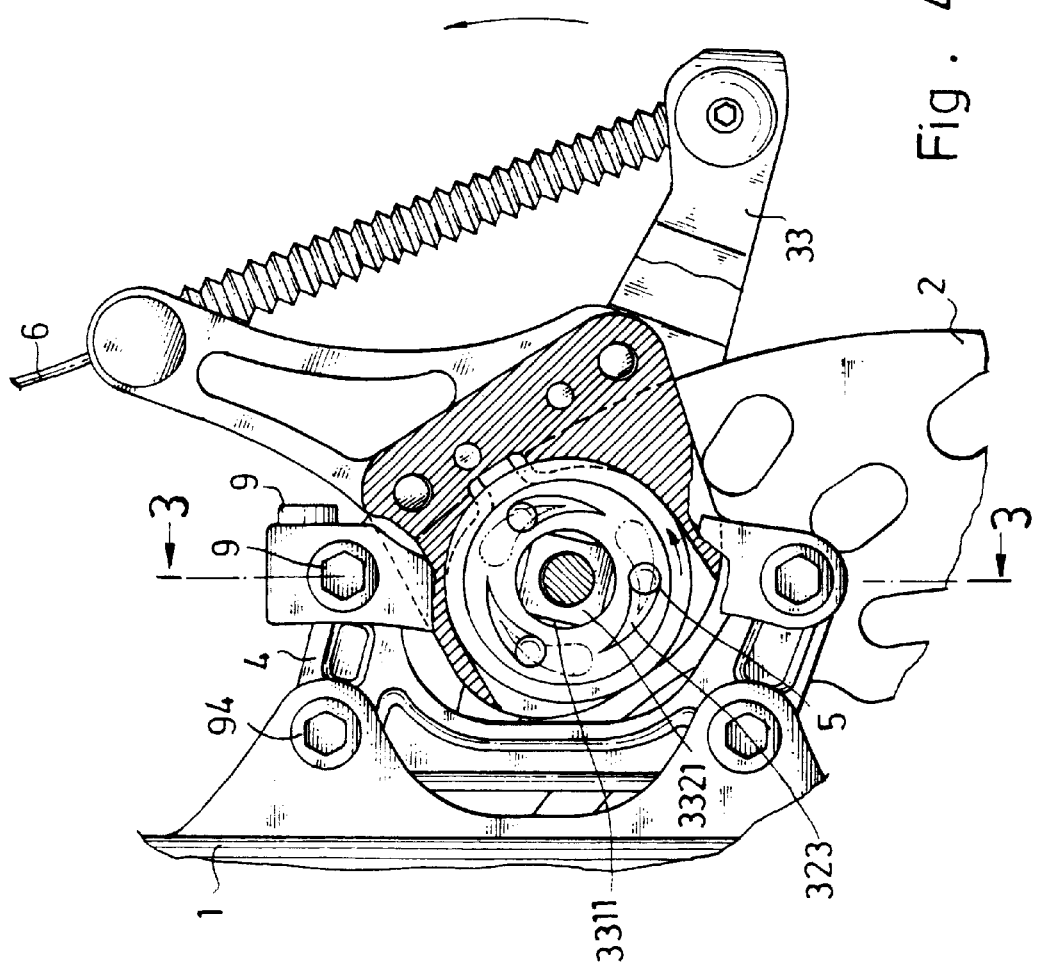
FIG. 4 is a sectional view of the present invention, showing the brake line pulled, the brake caliper operated.
Figure 5:
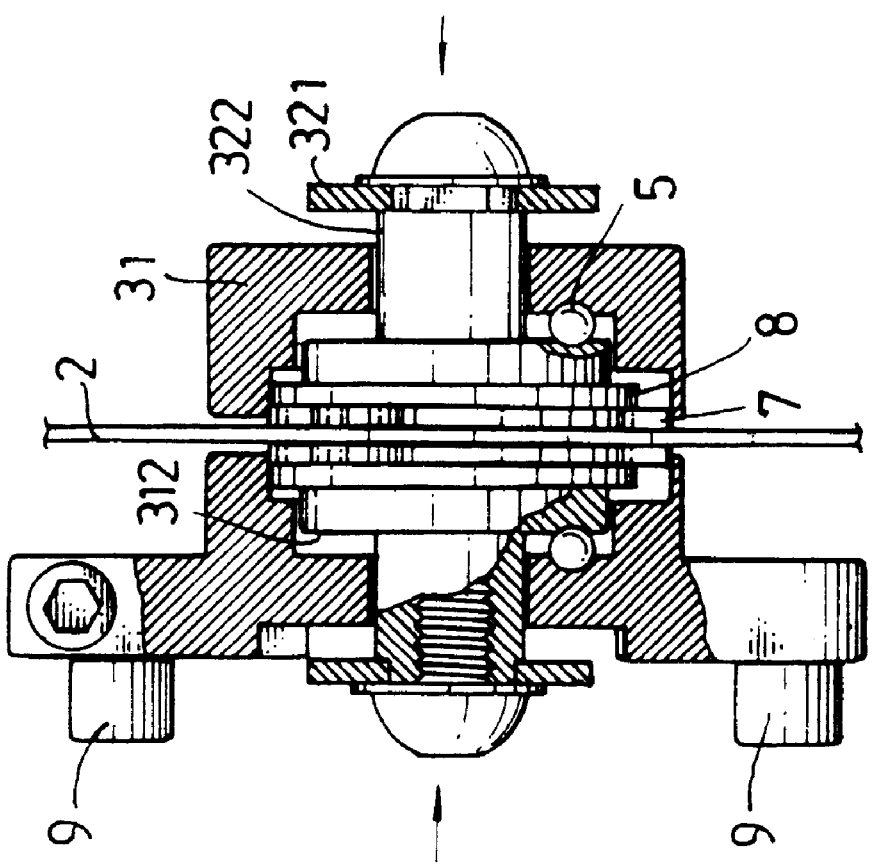
FIG. 5 is similar to FIG. 3 but showing the cam shafts moved toward each other, the fixed brake pads forced against the two opposite side walls of the brake disk according to the present invention.

Referring to FIGS. 4 and 5, because the square holes 3311 at the arms 321 of the pull bar 3 are respectively coupled to the square retaining end 3221 of the shaft body 322 of each of the cam shafts 32, the pull bar 33 is turned upwards through an angle when the brake line 6 is pulled by the bicycle rider, thereby causing the cam shafts 32 to be relatively rotated through an angle. When the cam shafts 32 are rotated, the steel balls 5 are moved along the respective ball grooves 323 at the cam shafts 32 in one direction, thereby causing the cam shafts 32 to be forced outwards toward two opposite side walls of the brake disk 2 (because the depth of the ball grooves 323 gradually reduces in one direction) and therefore the brake disk 2 is stopped. Because the steel balls 5 are moved in the equiangularly spaced ball grooves 323 at the respective cam shafts 32 and the respective inside annular grooves 3121 in the body 31 and because the cam shafts 32 synchronously moved, pressure is evenly imparted from the respective fixed brake Pads 7 to the brake disk 2. enabling the brake disk 2 to be positively and stably stopped.

Furthermore, by means of the mounting frame 4, the brake caliper 3 can be conveniently and accurately fastened to the lugs 12 at the front fork 1. The installation of the positioning screw bolts 9 enables the body 31 of the brake caliper 3 to be accurately coupled to the brake disk 2.

What is claimed is:

1. A front disk brake assembly comprising a brake disk fixedly mounted on a hub at a front fork of a bicycle, and a brake caliper mounted on the front fork of the bicycle and pulled by a brake line to actuate said brake disk, said brake caliper comprising a mounting frame fixedly mounted on the front fork of the bicycle, a body mounted on said mounting frame, two cam shafts mounted in said body, and a pull bar driven by the brake line to turn said cam shafts for enabling said cam shafts to be moved toward two opposite side walls of said brake disk, wherein:

said mounting frame is a substantially U-shaped member having two first screw holes and two second screw holes, said two first screw holes being configured to receive lugs for fastening said U-shaped member to the front fork of the bicycle, said body includes a narrow slot for receiving said brake disk, two receiving chambers at two opposite sides of said narrow slot, an inside annular groove respectively provided inside each of said receiving chambers, a plurality of steel balls respectively received within a plurality of semispherical receivers formed within said inside annular groove of each said receiving chamber, an axle hole extending through said receiving chambers and said narrow slot, two first screw holes provided at two opposite sides of said body through which respective mounting screws are fastened to said two second screw holes of said U-shaped member, two second screw holes disposed at two opposite sides of said body and respectively peripherally intersecting said two first screw holes of said body and two positioning screw bolts respectively threaded into said second screw holes of said body for retaining the mounting screws in place; and, said cam shafts are respectively mounted in the receiving chambers inside said body, each said cam shaft comprising a flat, circular head having a top side wall and a bottom side wall, a shaft body perpendicularly extended from the center of the bottom side wall of said circular head, a plurality of ball grooves formed at the bottom side wall of said circular head around said shaft body, said plurality of ball grooves receiving the steel balls within the inside annular grooves in said body, said shaft body having a square retaining end fastened to a respective square hole at one end of said pull bar, and said ball grooves each having a depth which gradually increases from a narrow end thereof toward a broad end thereof.

2. The front disk brake of claim 1 wherein said pull bar is a substantially U-shaped member comprising a transverse base connected to one end of the brake line, and two parallel arms perpendicularly extended from two opposite ends of said transverse base, said arms each having a square hole respectively fastened to the square retaining end of the shaft body of each of said can shafts.

3. The front disk brake of claim 1 wherein said cam shafts each comprise at least four ball grooves equiangularly spaced at the bottom side wall of the respective circular head.

4. The front disk brake of claim 1 wherein said positioning screw bolts each comprise a threaded shank respectively threaded into the second screw holes of said body, a head disposed outside said body, and a conical shoulder connected between the head and threaded shank of the respective positioning screw bolt and peripherally disposed in contact with the respective mounting screw in a respective one of the first screw holes of said body.

* * * * *